United States Patent [19]

Tunstall

[11] Patent Number: 4,697,378
[45] Date of Patent: Oct. 6, 1987

[54] FISHING LURE SYSTEM
[75] Inventor: John R. Tunstall, Charlotte, N.C.
[73] Assignee: Quixotic, Inc., Charlotte, N.C.
[21] Appl. No.: 783,594
[22] Filed: Oct. 3, 1985
[51] Int. Cl.⁴ .............................................. A01K 85/00
[52] U.S. Cl. .................................. 43/42.09; 43/42.22; 43/42.06
[58] Field of Search ................. 43/42.08, 42.06, 42.09, 43/42.5, 42.26, 42.22, 44.99

[56] References Cited
U.S. PATENT DOCUMENTS

| | | | |
|---|---|---|---|
| 1,740,335 | 12/1929 | Cowan | 43/42.09 |
| 1,993,990 | 3/1935 | Catarau | 43/42.16 |
| 2,008,004 | 7/1935 | Catarau | 43/42.16 |
| 2,538,181 | 1/1951 | Yates | 43/42.16 |
| 2,593,220 | 4/1952 | Thompson et al. | 43/42.09 |
| 2,994,983 | 8/1961 | Best | 43/42.09 |
| 2,996,826 | 8/1961 | Laman | 43/42.09 |
| 3,091,883 | 6/1963 | Hufford | 43/42.08 |
| 3,205,609 | 9/1965 | Knapton | 43/42.22 |
| 3,418,745 | 12/1968 | Loos | 43/42.09 |
| 3,608,228 | 9/1971 | Borresen et al. | 43/42.09 |
| 4,155,191 | 5/1979 | Spivey | 43/42.31 |
| 4,205,476 | 6/1980 | Hsu | 43/42.06 |
| 4,329,804 | 5/1982 | Brown | 43/42.06 |
| 4,553,348 | 11/1985 | Cooper | 43/42.06 |

Primary Examiner—M. Jordan
Attorney, Agent, or Firm—Ralph H. Dougherty

[57] ABSTRACT

A fishing lure system, wherein a lure has a base section with a head portion and a body portion extending rearwardly from the head portion, a removable back adapted to engage the base, a removable nose or dive plane assembly inserted into a cavity in the underside of the head portion, and fishing line and hook attaching means. The lure system has interchangeable dive planes to accommodate different depths, interchangeable nose planes to provide different lure actions, and interchangeable backs to give the lure different colors.

29 Claims, 40 Drawing Figures

FISHING LURE SYSTEM

BACKGROUND OF THE INVENTION

This invention relates to an improved fishing lure system including a lure that is readily transformable to represent a series of different baits and a plurality of depth controls, without removing the basic portion of the lure from the fishing line.

The invention provides an improved construction of fishing lure wherein a variety of different colors can be easily interchanged from the head portion to provide a plurality of color combinations and a variety of different dive or nose planes, at different angles, can be interchanged to provide a plurality of predetermined depths for the lure to seek in both fresh and salt water, and different actions for the lure.

Gell et al U.S. Pat. No. 4,337,591 teaches a fishing lure with both depth control and a variety of body parts. Weights in the Gell invention are placed in a cavity in the central body core, the construction of the lure requiring several parts, which must be assembled, and retained in position with bands. The color patterns are placed on either side of the central body before the clear plastic shields are placed on each side of it. The parts are all held together with bands, which secure the lure components together, the rear band providing action-imparting surfaces. Rogers U.S. Pat. No. 2,295,292 teaches a lure construction of different sizes, shapes and color combinations, which are held together with a spring or coil which is connected to the end hook. Both the head and body portion have interchangeable colors, again requiring a larger number of pieces to be carried in a bait or tackle box. The present invention readily combines the interchange of colors, merely by changing to a different colored back without taking the lure from the fishing line, and the plurality of depth controls which cause the lure to plunge from the surface to a desired depth. This is accomplished with an easy snap action and does not require tools to change the different parts.

This invention provides an improved connecting means between the head and the body portion which requires no tools to effect the connection, but is achieved by pressure between the two parts. In addition, the invented fishing lure system provides a plurality of interchangeable, transparent nose or dive planes which are also detachable without tools. A careful selection of the dive planes gives the fisherman the ability to fish in shallow or deep water without replacing the entire lure, but by only replacing the dive plane. It is well known that fish strike at different depths and at different colors of artificial bait or lures depending on such conditions as time of day, location, or the fisherman's quarry. Therefore it is important to have a fishing lure system in which parts of the lure can readily be changed to adapt to these various conditions. It requires a considerable investment for a fisherman to purchase all the necessary lures to cover all of the different conditions which are met by the angler in the course of his fishing day. In the case of lures or artificial bait, it is desirable to be able to interchange only one or two parts of the lure, rather than the entire lure. The successful angler needs a lure which is designed to operate with a variety of different colors that are interchangeable as fishing conditions warrant, and without a significant investment in a variety of different lures, to achieve the necessary goals with a minimum of equipment. The present invention is a lure system which requires greatly reduced capital expenditures, as well as a reduced amount of equipment required to be carried by the successful angler.

A feature of the present invention is that the dive plane is transparent. In many presently available lures which incorporate dive planes, the dive planes are metallic, which create a flashy appearance attracting the attention of the fish, which then strikes at the front portion of the lure. Frequently, the fish strikes the line at the same time, severing the line, causing loss of both fish and lure. Since the dive plane in the present invention is transparent, there is no attraction to a fish at the head of the lure, thus the fish will tend to strike at the body of the lure. In this way, the lure will be more effective.

The base may be the portion which has the color, in which case the back and dive plane are clear and will pick up the color of the base.

A nose plane can be interchanged with the dive plane to provide surface action for the lure. A nose plane is attached in exactly the same manner as the dive planes and in the same cavity within the lure.

One embodiment of the invention features a small piece of formed wire embedded in the entire length of the body. The purpose of the wire is two fold, (1) to add strength to the lure itself, and (2) to act as a reinforced fastener to fasten the three pronged fishing hook so that it will not easily be pulled from the lure. This is a new concept in fishing lure equipment. Many of the presently available hooks are fastened to a lure by the use of a small screw eye which is twisted into a guide hole in the lure, and which is easily pulled out of the lure if undue stress is put upon the lure by either a fish or a foreign object on which the hook may be caught in the process of fishing. The present invention eliminates the need to discard an expensive lure due to broken dive planes, eliminates the possibility of having only the wrong color plug, eliminates the problem of having a lure with the wrong dive or nose plane, eliminates the necessity to carry a large number of different lures required to meet all fishing conditions, and greatly reduces the possibility of losing or stripping the hooks from the body of the lure and rendering the lure unusable.

OBJECTS OF THE INVENTION

Therefore, it is the principal object of this invention to provide a fishing system comsisting of a lure base, a removable back component, a plurality of nose planes for depth, a plurality of color patterns, and a transparent base that takes on the color of the back when attached.

It is also an object of this invention to provide a lure which can be used for surface fishing to provide an irregular zigzag action to the lure, or alternatively to provide a noisy, active lure which creates noise and bubbles.

A further object of this invention is to provide an improved lure or artificial bait system consisting of a single basic lure with interchangeable parts.

It is another object of this invention to provide an improved lure or artificial bait which can readily be changed in appearance without removing the original lure from the fishing line.

Another object of this invention is to provide a lure which can be used for fishing in both fresh water and salt water by interchanging parts.

Another object of this invention is to provide a lure in which all parts may be interchanged without the use of tools.

Another object of this invention is to provide a new system of construction whereby a formed wire is positioned within the entire body length which will provide strength and a means for attaching the stainless steel fish hooks so they cannot easily pull out of the body of the lure.

BRIEF DESCRIPTION OF THE DRAWINGS

This invention is better understood by referring to the following detailed description and the appended drawings in which.

DETAILED DESCRIPTION

Figure 1:
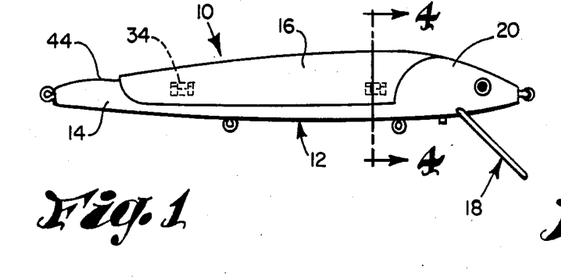
FIG. 1 is a side elevational view of the preferred embodiment of the invented lure.
Figure 4:
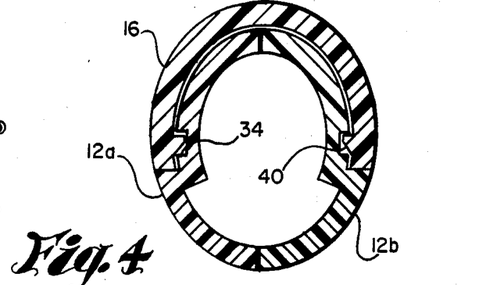
FIG. 4 is a vertical cross-section of the lure of FIG. 1 taken along line 4—4 of FIG. 1.

Referring now to FIG. 1, lure 10 consists of three principal parts, a base 12 a back 16, and a dive plane assembly 18. The base or body 12 has a head portion 20 and a rearwardly extending portion 22. The base 12 is preferably made of two mating sections 12 and 12b, as shown in FIG. 4, the sections being joined by sonic welding, application of heat, or adhesive material.

A recess 28 (FIG. 7) is provided in the top of the base at the rear of the head portion 20 for engagement by tab 30 of back 16. Depressions or recesses 34 are provided in the sides of body 12 as shown in FIGS. 1 and 4 for engagement by lugs 40 carried on the inside of back 16. Each half of the base 12 is preferably hollow as shown in FIG. 4. This will provide the buoyancy necessary to assist the lure in floating.

Figures 2, 5:
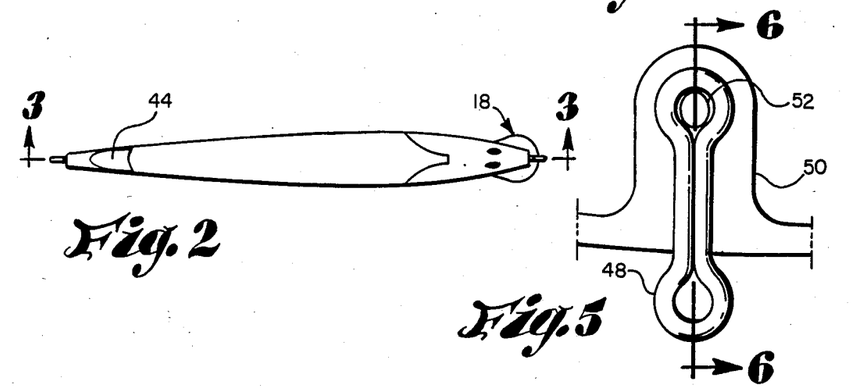
FIG. 2 is a top view of the lure of FIG. 1.
FIG. 5 is a detailed view of a portion of FIG. 3 on a larger scale.
Figure 3:
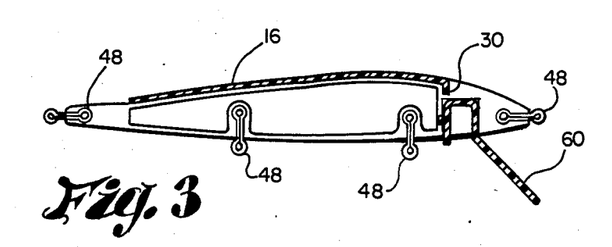
FIG. 3 is a vertical longitudinal sectional view taken along line 3—3 of FIG. 2.

As shown in FIGS. 1, 2, and 3, the rearmost portion of base 12 has on its top a flat spot 44 which allows a fingernail or other object to catch the rear end of back 16 to pry it up and remove it.

Figure 6:
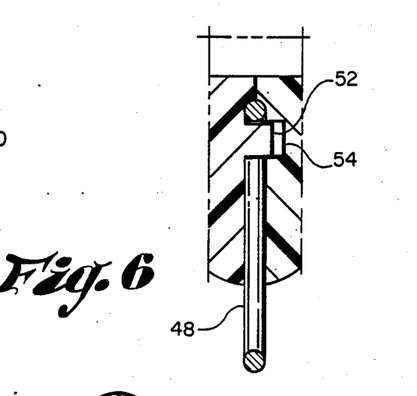
FIG. 6 is a vertical elevational view taken along line 6—6 of FIG. 5.

Each of the dual eyelets 48, four of which are shown, one at the front or nose, one at the tail, and two underneath the lure, is mounted as shown in FIGS. 5 and 6. The base 12a has a solid upstanding portion 50 with a slight recess into which the eyelet fits, and a projection 52 of a size to engage one eye of eyelet 48. The base section 12b has a mating recess 54 for the projection 52. When assembled, the eyelets fit tightly over the projections and are held in place by the opposing base section.

Figure 7:
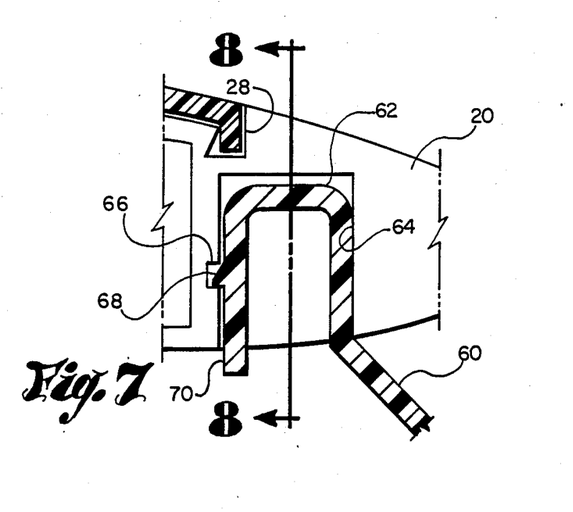
FIG. 7 is an enlarged view of a portion of FIG. 3 showing the eyelet assembly.

The dive plane assembly 18 consists of the dive plane 60, which extends downwardly at an angle from the head 20 of the lure. The anchor portion 62 is a resiliant material formed into a U-shape to fit easily within cavity 64 within the head 20. The cavity 64 has a lug retaining recess 66 at its rearward side. A retaining lug 68, integral with the dive plane assembly, is adapted for engagement with the recess 66. The dive plane assembly extends outwardly from the bottom of the lure as shown at 70 to provide a lever arm for disengaging the lug 68 from lug retaining recess 66.

Figure 8:
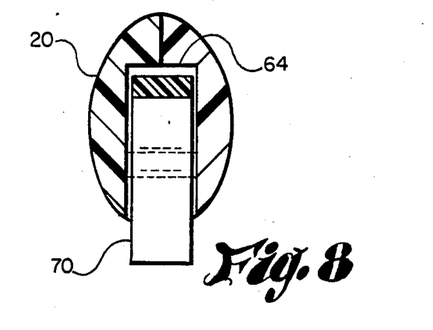
FIG. 8 is a vertical cross-section of the base of the lure with the back removed, taken along lines 8—8 of FIG. 1.

FIGS. 9 through 20 show four different types of dive planes or nose planes which may be utilized with the invented lure. An alternative retainer means for these dive planes or nose planes is shown, but the same retainer means shown in the preferred embodiment in FIGS. 7 and 8 can be utilized.

Figures 9, 10:
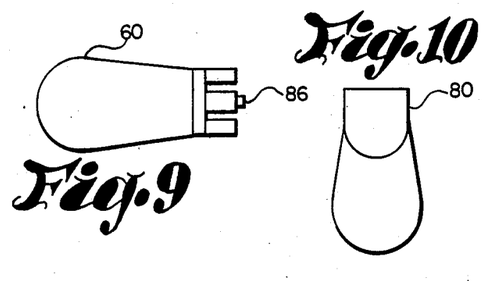
FIG. 9 is a bottom view of a dive plane insert for the lure of FIG. 11.
FIG. 10 is a left end (front) view of the dive plane of FIG. 9.
Figure 11:
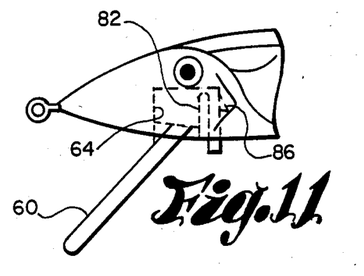
FIG. 11 is a partial side view of an assembled lure showing the dive plane of FIGS. 9 and 10 in place within the lure assembly.

In the dive plane of FIGS. 9 through 11, a clear plastic block 80 has a cavity 82 therein and a downwardly extending retaining member 84 having a lug 86 which fits into a recess in the back wall of the cavity 64 within the lure. The dive plane extends downwardly from the block 80 at the angle desired for the proper fishing depth.

Figures 12, 13, 14:
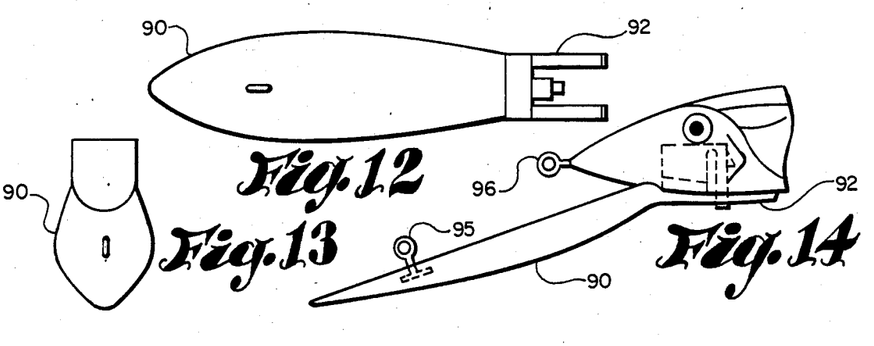
FIG. 12 is a top view of an alternative dive plane to that of FIG. 10.
FIG. 13 is a left-end view (front view) of the dive plane of FIG. 12.
FIG. 14 is a partial assembly view of an embodiment of the invented lure utilizing the dive plane of FIGS. 12 and 13 in the lure assembly.

FIG. 12 depicts a considerably larger dive plane 90 than the dive plane of FIG. 11. In this embodiment, a pair of rearwardly extending lugs 92 fit flush against the bottom of the lure to resist torque established between the lure base 12 and the dive plane 90 when being propelled through water. The dive plane 90 carries an eyelet 95. When utilizing this longer dive plane, the fishing leader is attached to eyelet 95 in the dive plane rather than to eyelet 96 in the nose of the lure, again in order to prevent excessive torque resulting in destruction of the dive plane while fishing.

Figure 15:
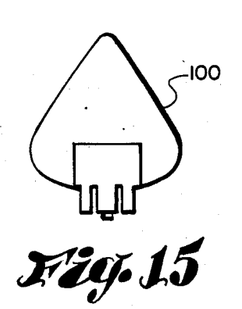
FIG. 15 is a top view of a nose plane.
Figure 16:
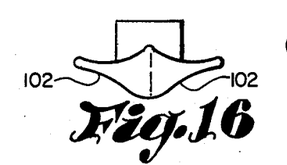
FIG. 16 is a front view of the nose plane of FIG. 15.
Figure 17:
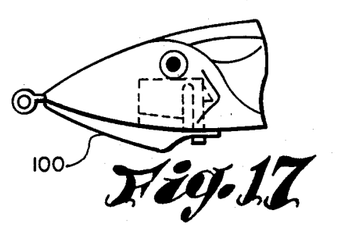
FIG. 17 is a partial assembly view of a lure utilizing the nose plane of FIGS. 15 and 16.

FIGS. 15, 16, and 17 show a nose plane 100 which can be substituted for any of the dive planes. The nose plane 100 fits flush against the bottom of the head of the lure. The lower faces 102 of the nose plane 100 form a mirror image, curved in any desired manner, but generally in a manner similar to a mold board of a plow. The curves on the lower face of the nose plane cause it to zigzag through the water at or near the surface giving the appearance of a wounded or confused bait fish.

Figure 18:
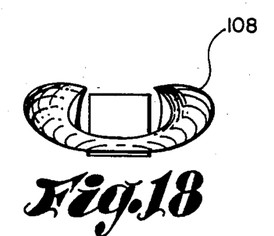
FIG. 18 is a front view of an alternative nose plane to that of FIG. 15.
Figure 19:
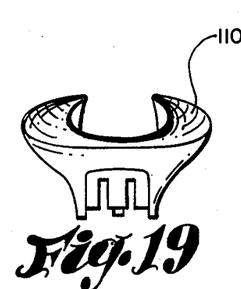
FIG. 19 is a bottom view of the nose plane of FIG. 18.
Figure 20:
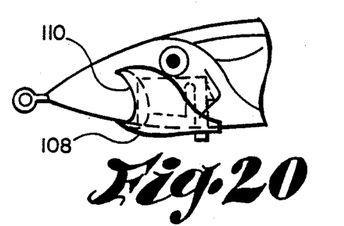
FIG. 20 is a partial side elevational view of the lure assembly utilizing the nose plane of FIGS. 18 and 19.

FIGS. 18, 19, and 20 depict an alternative nose plane 108 which has a forward facing curved surface 110. In use, this surface acts as a scoop, agitating the water surface with loud noises, the creation of bubbles, and taking on a thrashing action which will attract the attention of predator fish.

Figures 21, 23, 24, 25:
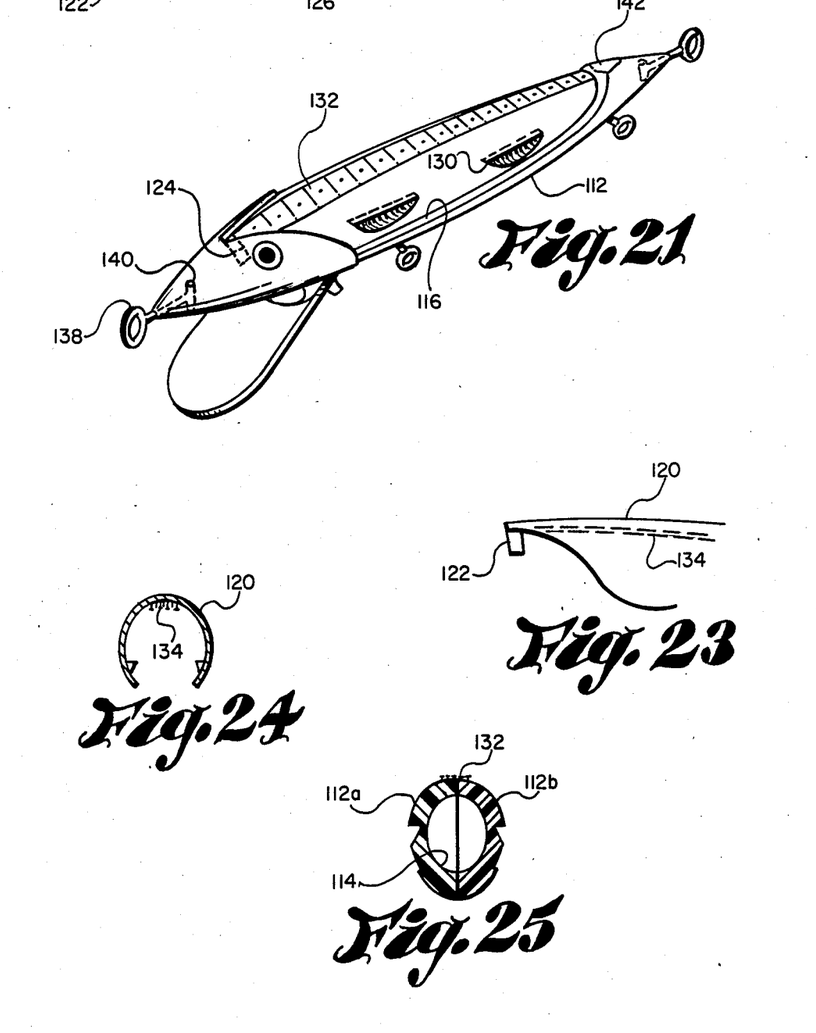
FIG. 21 is an isometric view of another alternative embodiment of the invented lure with the back removed.
FIG. 23 is a partial longitudinal section of the back of FIG. 22 taken along its centerline.
FIG. 24 is a cross-section of the back of FIG. 22.
FIG. 25 is a cross-section of an alternative embodiment of the base of FIG. 21.
Figure 22:
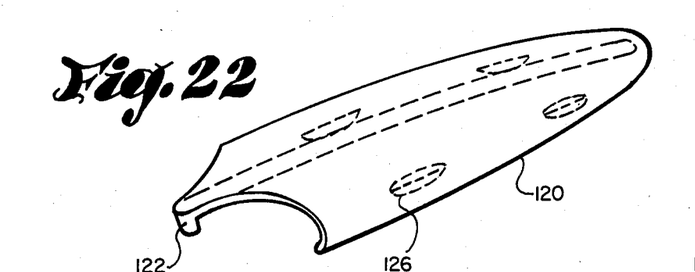
FIG. 22 is an isometric view of the back which had been removed from the embodiment of FIG. 21.

The embodiment of FIG. 21 has a base molded in two parts 112a and 112b, to form a hollow interior 114 as shown in FIG. 25. A molded recess 116 is adapted for the interfitting of back 120 into the recess. The back preferably has a downwardly extending lug 122 at the head end for engagement in lug recess 124 of the base, and raised lugs 126 on each side of the underside of back 120. The snap-on back 120 is installed by fitting lug 122 into recess 124 within the head of the base, then snapping the back downwardly so the raised lugs or back retainers 126 snap into mating recesses 130 in the base. If desired, a self adherent fabric ribbon 132 or tape having mating hook and pile portions is advantageously fixed to the top of the lure base and a second mating self-adherent fabric ribbon or strip 134 is fixed to the underside of the snap-on back as shown in FIGS. 24 and 25. Suitable self-adherent strips are VELCRO tapes. VELCRO is a registered trademark of a fabric fastener material manufactured by International Velcro Company, and is the subject of two or more patents of George de Mestral under U. S. Pat. Nos. Numbers 2,717,437 and 3,009,235.

In this embodiment, the line and hook eyelets 138 shown can be placed within the base 112 during the molding process, the base preferably being clear acrylic, and the eyelets have a flange 140 which greatly increases the resistance to pulling out of the base. At the top rear of the base 112, a flat surface 142 provides access to the rear of the back 120 for a finger or other object to assist in prying up the back for its removal.

Referring now to the embodiment as illustrated in FIGS. 26 through 32, lure assembly 150 is a three part system having a base 152 comprising the head and underbody, a back 154, and a dive plane assembly 156. The head and underbody of the lure are preferably made of clear acrylic. When the removable back 14 of the lure is snapped into place, the entire lure takes on the color of the back. The nose or dive plane 158, which fits into cavity 159 in base 152, is also a clear acrylic. Changing the angle and size of the dive plane adjusts the depth the lure will plunge into the water. One nose plane will allow the lure to skim along the top of the water. If the fish are feeding deep, the system has a dive plane which will cause the lure to dive to the required depth.

Figure 26:
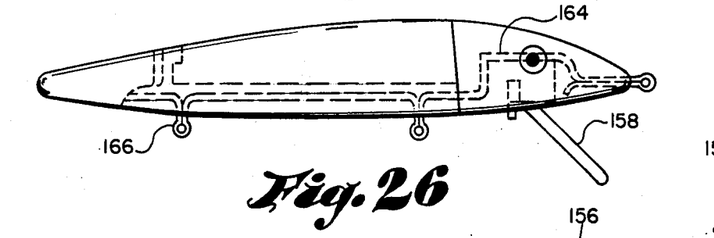
FIG. 26 is a side elevational view of an alternative embodiment of the invented lure as assembled.
Figure 27:
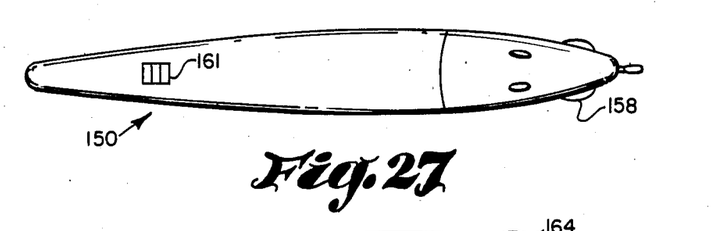
FIG. 27 is a top view of the assembled lure of FIG. 26.
Figure 28:
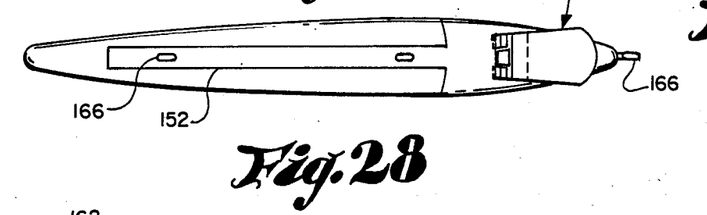
FIG. 28 is a bottom view of the lure of FIG. 26.
Figure 29:
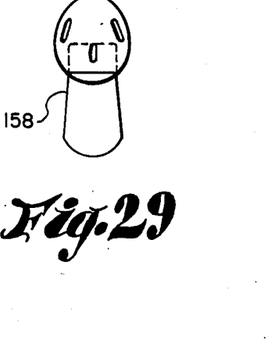
FIG. 29 is a right end view of the lure of FIG. 26.
Figure 30:
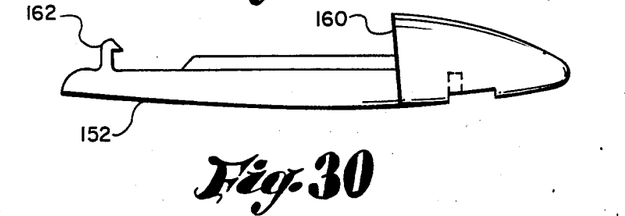
FIG. 30 is a side elevational view of the base portion of FIG. 26.
Figure 31:
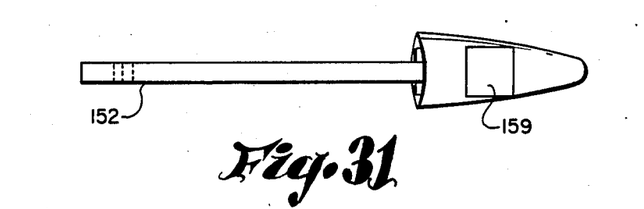
FIG. 31 is a bottom view of the lure base of FIG. 30 with all other parts removed.

Back 154 has a vertical stepped hole 161 therethrough for receiving upstanding catch 162 of base 152. The rearward surface 160 of the head is flat and tapered rearwardly at a 50° angle, so it acts as a retainer to hold the back 154 in place on the base. The top opening of the hole 161 permits access for a finger or a tool for urging the resilient upstanding catch 162 backward to release it, allowing the back to be lifted off of the base.

As shown in FIG. 26, a bent wire 164 can be molded into place within the base 152. The confuguration of the wire is such that it avoids the cavity in the base for the dive plane. It can also be so bent as to provide the eyelets 166 for attachment of fishhooks and fishing leader.

Figure 32:
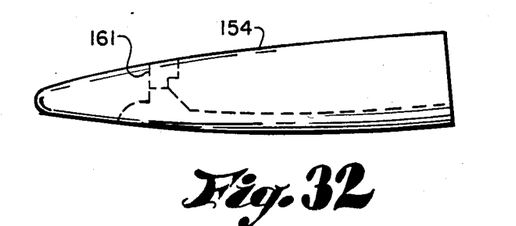
FIG. 32 is a side view of a replaceable back for the invented lure.
Figure 33:
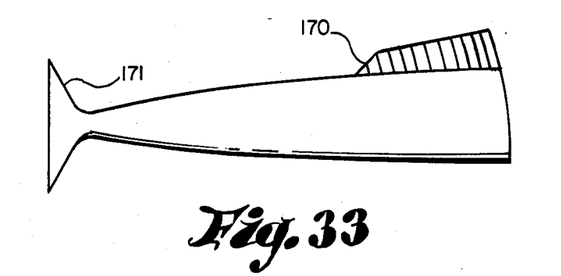
FIG. 33 is a side view of an alternative replaceable back.
Figure 34:
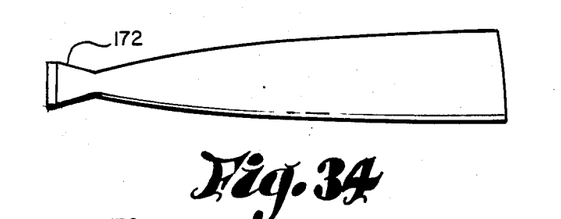
FIG. 34 is a side view of another alternative replaceable back.
Figure 35:
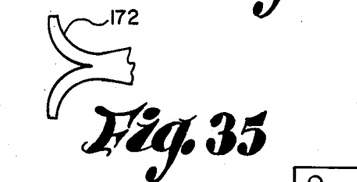
FIG. 35 is a partial top view of the tail portion of the back of FIG. 34.
Figure 36:
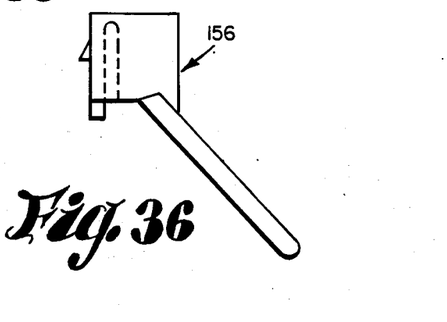
FIG. 36 is a side view of the dive plane assembly used in the lure of FIG. 26.
Figure 37:
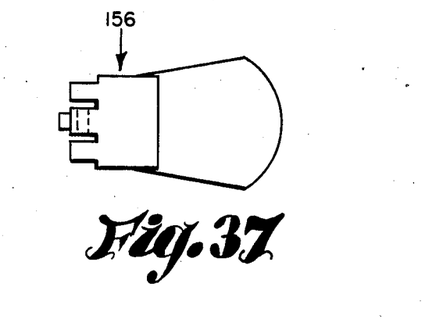
FIG. 37 is a top view of the dive plane assembly of FIG. 36.

Back 154, as shown in FIG. 32, can be modified as shown in FIGS. 33 or 34 to include dorsal fin 170, a more realistic tail 171, or a split tail 172 as shown in FIGS. 34 and 35. The detail of the retaining mechanism for the dive plane assembly 156 is shown more clearly in FIGS. 36 and 37.

Figure 38:
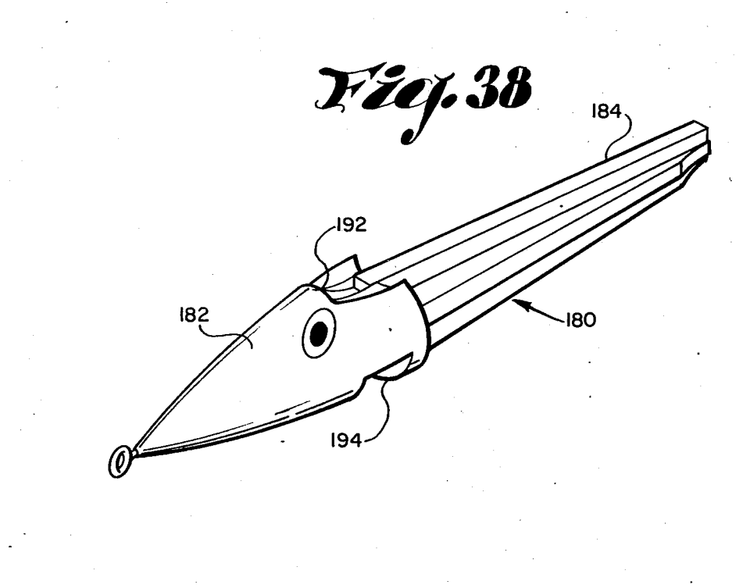
FIG. 38 is an isometric view of the base of an alternative embodiment of the invented lure.
Figure 39:
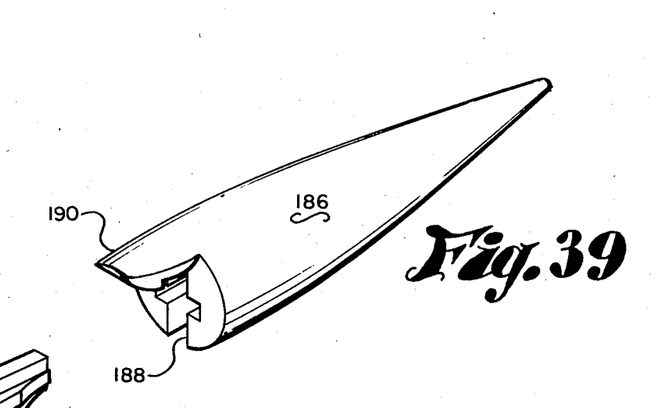
FIG. 39 is an isometric view of a back portion engageable with the base of FIG. 38.
Figure 40:
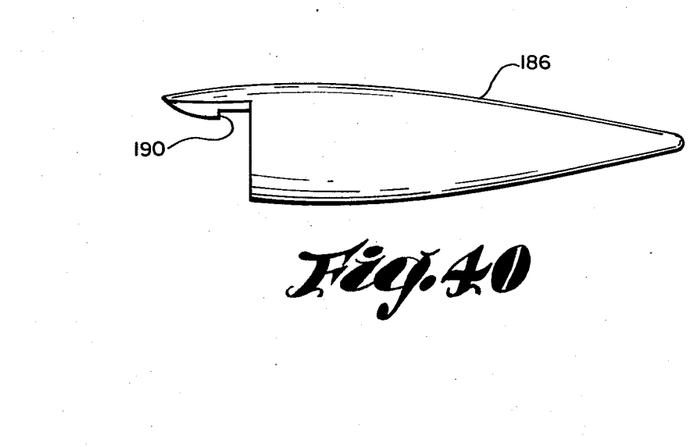
FIG. 40 is a side elevational view of the back portion of FIG. 39.

The embodiment shown in FIGS. 38 to 40 includes a base 180 having a head portion 182 and rearwardly extending body support 184, which has a generally cross-shaped cross section. The removable body portion 186 has a mating slot 188, which is cross-shaped in the drawing, but must have the same internal configuration as the external confuguration of the base onto which it fits, and a projecting tab 190 which has a retaining hook on its underside for engaging the head portion. A recess 192 in the head allows a thumbnail to reach under the hook to disengage the body portion from the base. In the same manner as the other embodiments, a nose or dive plane can be inserted into recess 194 in the underside of the head portion.

In all embodiments shown, the back portion of the lure system can be constructed of rigid transparent plastic, or alternatively may be soft pliable polyurethane plastic capable of flexibility and floatation. The back may have a tail and fins giving the lure lifelike characteristics.

The body preferably is provided with hatch marks which resemble scales. These can be printed, embossed, or recessed, but are preferably embosssed. If they are embossed, they will provide a rough surface which will also allow the fisherman to take a firm grip on the lure, even after it has been in the water and is somewhat slippery.

SUMMARY OF THE ACHIEVEMENT OF THE OBJECTS OF THE INVENTION

From the foregoing it is readily seen that I have provided a fishing lure system which is both functional and efficient with a minimum of capital investment.

It is also apparent from the foregoing that other alternative embodiments of the invention are possible. Thus, while in accordance with the patent statutes, both prefered and alternative embodiments of the invention have been illustrated and described in detail, it is to be particularly understood that the invention is not limited thereto or thereby, but only by the scope of the following claims.

What is claimed is:

1. A fishing lure, comprising:
   a base section having a head portion, and a body portion extending rearwardly from said head portion, a downwardly opening cavity being provided in the underside of said head portions;
   a removable back adapted to engage said base;
   a nose plane assembly having a base adapted for insertion and engagement in said cavity, a retaining lug affixed to said nose plane assembly for engagement in a mating recess within said cavity, and means for disengaging said lug from said mating recess for removal of said nose plane assembly, and an action-creating portion exterior of said cavity;
   means affixed to said head portion for attaching a fishing line thereto; and
   means affixed to said body portion extending rearwardly from said head portion for receiving at least one fishing hook.

2. A lure according to claim 1 further comprising a bent reinforcing wire embedded in said base portion, and passing around said cavity.

3. A lure according to claim 2 wherein said wire extends exteriorly forming a loop at the end of said head portion for receiving a fishing line.

4. A lure according to claim 2 wherein said reinforcing wire projects through the bottom of said rearwardly extending base section to form at least one hook hanger.

5. A lure according to claim 1 wherein said rearwardly extending base portion includes an upstanding projection near its rear end which is adapted for engagement with said removable back.

6. A lure according to claim 5 wherein said back has a vertical hole with a notch at the top thereof for engagement by said upstanding projection of said base.

7. A lure according to claim 1 wherein said base is formed of two opposing sections bonded together to form a hollow, closed cavity therein.

8. A lure according to claim 7 wherein said opposing sections have solid retaining means for eyelets, one of said opposing sections carrying a projection adapted for engagement by an eyelet, and the other of said opposing sections being provided with a mating recess for receiving said projection.

9. A lure according to claim 8 wherein said eyelet is a dual eyelet, one end in engagement with said projection, and the other end extendig external to the base for engagement by a fishhook or fishing line.

10. A lure according to claim 1 wherein said nose plane assembly has a dive plane extending forwardly and downwardly at an angle effective to seek a desired plunge depth.

11. A lure according to claim 10 wherein said dive plane is elongated, and said assembly carries rearwardly extending flanges for flush engagement with the underside of said body rearward of said cavity.

12. A lure according to claim 11 wherein said elongated dive plane includes means for fishing line attachment.

13. A lure according to claim 1 wherein said nose plane is adapted to fit flush against the underside of said head portion, said nose plane being a generally triangular configuration, when viewed from its underside with mirror image concave curved faces on its underside, whereby the lure will move in a zigzag motion when in use.

14. A lure according to claim 1 wherein said nose plane is adapted to fit against the underside of said head portion, said nose plane extending upwardly on each side of said head portion and having a concave forward face, forming a scoop around at least the bottom half of the head portion, whereby in use the lure will agitate the water surface noisily, creating bubbles to attract predator fish.

15. A lure according to claim 1 wherein said base has a recess in the head portion, and said removable back carries a downwardly extending lug on its underside for engaging said recess.

16. A lure according to claim 1 wherein said removable back includes an upstanding dorsal fin.

17. A lure according to claim 1 wherein said removable back carries embossed scales.

18. A lure according to claim 1 wherein said removable back carries a fish-like tail.

19. A lure according to claim 1 wherein said removable back carries a split tail.

20. A lure according to claim 1 wherein said base carries a VELCRO fastener on the upper part of the rearwardly extending portion, and said removable back has a mating VELCRO fastener.

21. A lure according to claim 1 wherein said means for attaching a fishing line is an eyelet having a T-flange embedded in said head portion.

22. A lure according to claim 1 wherein said means for receiving a fishing hook is an eyelet having a T-flange embedded in said body portion.

23. A lure according to claim 1 wherein the head portion has a recess at rear top surface for access by a tool or other back disengaging means.

24. A lure according to claim 1 wherein said removable back carries lugs on its underside, and said rearwardly extending body carries mating indentations to receive said lugs, whereby the resilience of said back holds said lugs in engagement with said indentations when said back is in place.

25. A lure according to claim 24 wherein said body portion has an upper recessed area adapted for engagement by said removable back and flat upper surface rearward of said recessed area adapted for access to the rearward edge of said back by a finger or tool for removal of said back.

26. A lure according to claim 1 wherein said nose plane base is a formed strip of resilient plastic having a retaining lug on its rearward-facing surface adapted for engagement in a mating recess in said cavity.

27. A lure according to claim 1 wherein said rearwardly extending body portion has a shaped cross-section, and said back has a mating internal cross-section.

28. A lure according to claim 27 wherein said shaped cross-section has the configuration of a cross.

29. A lure according to claim 27 wherein said back carries a forwardly projecting tab with a retaining hook on its underside for engaging a mating recess in said head portion.

* * * * *